United States Patent
Burkey et al.

(10) Patent No.: US 12,439,866 B2
(45) Date of Patent: Oct. 14, 2025

(54) SMART IRRIGATION SYSTEM

(71) Applicant: REALMFIVE, Inc., Lincoln, NE (US)

(72) Inventors: Brant Burkey, Denton, NE (US); Dan Pickerill, Milford, NE (US); Tim Adkins, Plattsmouth, NE (US); Mateusz Mittek, Lincoln, NE (US); Steve R. Tippery, Gretna, NE (US)

(73) Assignee: REALMFIVE, Inc., Lincoln, NE (US)

( * ) Notice: Subject to any disclaimer, the term of this patent is extended or adjusted under 35 U.S.C. 154(b) by 223 days.

(21) Appl. No.: 16/830,085

(22) Filed: Mar. 25, 2020

(65) Prior Publication Data
US 2020/0305366 A1     Oct. 1, 2020

Related U.S. Application Data

(60) Provisional application No. 62/823,325, filed on Mar. 25, 2019.

(51) Int. Cl.
*A01G 25/16*     (2006.01)
*A01G 25/09*     (2006.01)
*B60K 31/00*     (2006.01)

(52) U.S. Cl.
CPC ........... *A01G 25/16* (2013.01); *A01G 25/092* (2013.01); *B60K 31/0008* (2013.01); *B60Y 2200/40* (2013.01); *B60Y 2400/302* (2013.01); *B60Y 2400/307* (2013.01); *B60Y 2400/3086* (2013.01)

(58) Field of Classification Search
CPC .... A01G 25/16; A01G 25/092; A01G 25/167; B60K 31/0008; B60Y 2200/40; B60Y 2400/302; B60Y 2400/307; B60Y 2400/3086
See application file for complete search history.

(56) References Cited

U.S. PATENT DOCUMENTS

| | | | | |
|---|---|---|---|---|
| 4,228,955 A | * | 10/1980 | Petersen | A01G 25/092 239/DIG. 1 |
| 4,330,085 A | * | 5/1982 | Siekmeier | A01G 25/097 137/899.1 |
| 4,432,494 A | | 2/1984 | Hunter | |

(Continued)

FOREIGN PATENT DOCUMENTS

| | | | |
|---|---|---|---|
| CA | 2029124 A1 | * | 11/1990 |
| EP | 1640930 A2 | | 3/2006 |
| WO | 9728692 A1 | | 8/1997 |

OTHER PUBLICATIONS

International Search Report and Written Opinion mailed Jun. 22, 2020 for PCT/US2020/024768.

*Primary Examiner* — Chad G Erdman
(74) *Attorney, Agent, or Firm* — Sulter Swantz IP

(57) ABSTRACT

A self-monitoring and self-controlling smart irrigation system is provided. The smart irrigation system may include a plurality of tower control units, which tower control units include one or more processors, one or more memory units, and communication circuitry. The tower control units may be configured to determine one or more operational conditions of the smart irrigation system, to communicate to other tower control units the operational conditions, and to make adjustments based on the operational conditions. The tower control units may be configured for expedient and efficient replacement and maintenance in that they may be readily detachable from the smart irrigation system.

23 Claims, 18 Drawing Sheets

(56) References Cited

U.S. PATENT DOCUMENTS

| | | | |
|---|---|---|---|
| 6,512,992 B1 | 1/2003 | Fowler et al. | |
| 6,721,630 B1 | 4/2004 | Woytowitz | |
| 8,204,630 B2 * | 6/2012 | Wilson | A01G 25/16 |
| | | | 700/284 |
| 11,061,144 B2 * | 7/2021 | Thatcher | G01S 19/14 |
| 11,326,867 B1 * | 5/2022 | Stewart, II | G01B 7/31 |
| 2002/0008167 A1 * | 1/2002 | Haberland | A01G 25/167 |
| | | | 239/722 |
| 2012/0170203 A1 | 7/2012 | Oberpriller et al. | |
| 2014/0326808 A1 * | 11/2014 | Malsam | B05B 9/007 |
| | | | 239/728 |
| 2017/0349060 A1 * | 12/2017 | Abts | A01G 25/092 |
| 2018/0020611 A1 * | 1/2018 | LaRowe | A01M 25/006 |
| | | | 701/2 |
| 2019/0021245 A1 | 1/2019 | Thatcher | |
| 2019/0285422 A1 * | 9/2019 | Opitsch | G01C 21/3852 |
| 2020/0113144 A1 * | 4/2020 | Moeller | A01G 25/165 |

\* cited by examiner

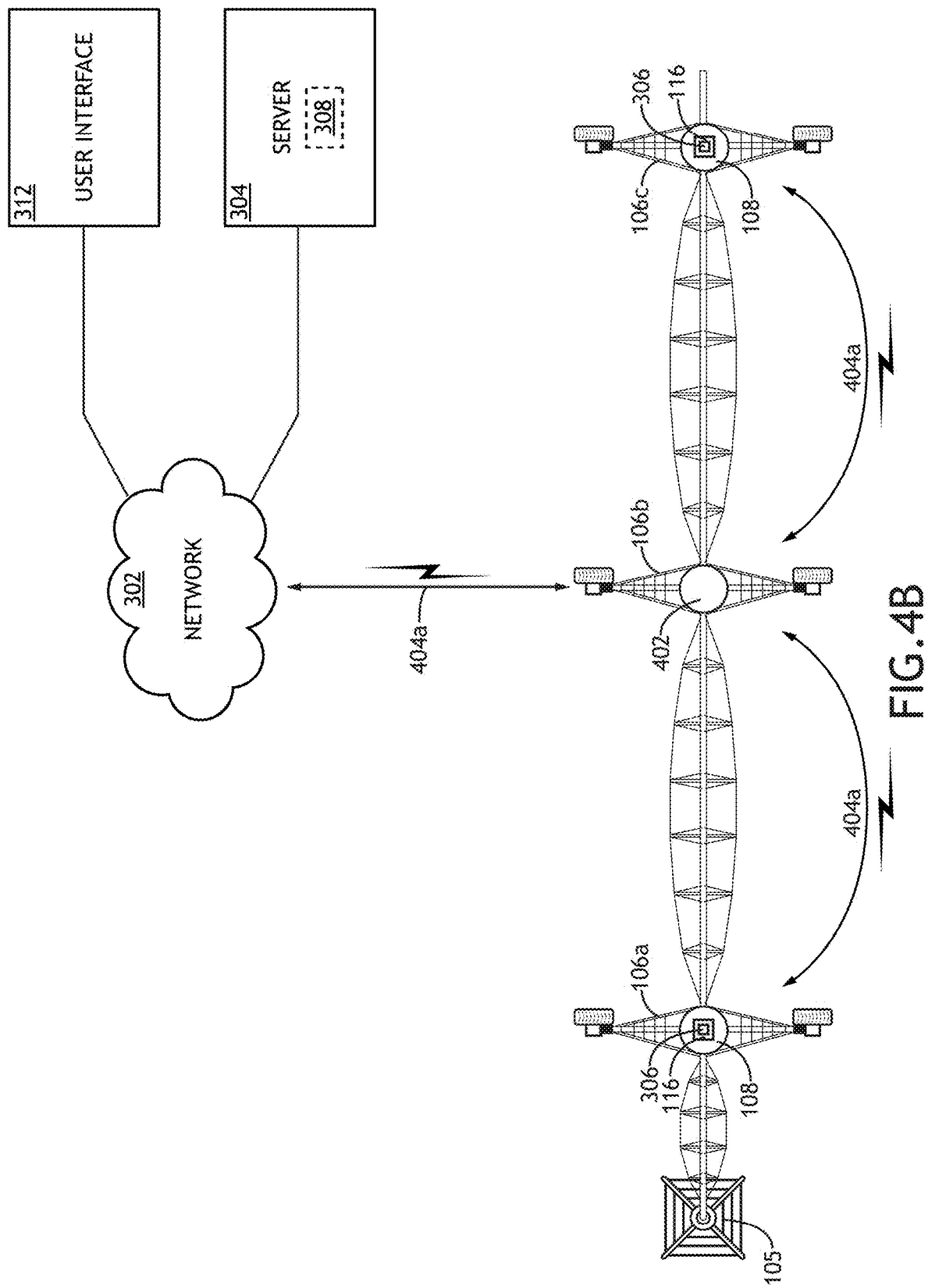

SMART IRRIGATION SYSTEM

CROSS-REFERENCE TO RELATED APPLICATION

The present application is related to and claims the benefit under 35 USC § 119(e) of U.S. Provisional patent application entitled SMART TOWER BOX, naming Brant Burkey, Dan Pickerill, Tim Adkins, and Mateusz Mittek as inventors, filed Mar. 25, 2019, Application Ser. No. 62/823,325, which is incorporated herein by reference in the entirety.

TECHNICAL FIELD

The present invention generally relates to an agricultural irrigation system, and, more particularly, to a self-monitoring and self-controlling agricultural irrigation system equipped with multiple sensor-enabled tower control units.

BACKGROUND

Agricultural irrigation systems are utilized to provide irrigation to crops across large fields, such fields often having irregular topography and boundaries. The traditional method of controlling and maneuvering an irrigation system involve the use of mechanical linkages between the irrigation towers of an irrigation system and the adjacent tower spans and micro-switches to determine tower alignment or misalignment. This approach is cumbersome and often fails to properly align or maneuver towers of the irrigation system. In addition, the diagnosis, repair, and maintenance of the irrigation system is labor-intensive and time consuming, with the diagnosis of malfunctioning components of an irrigation typically involving manual efforts. Therefore, it would be desirable to provide a system and method that cure the shortfalls of the previous approaches identified above.

SUMMARY

A smart irrigation system is disclosed, in accordance with one or more embodiments of the present disclosure. In one embodiment, the smart irrigation system includes a pipeline, which pipeline includes a plurality of pipe spans. In another embodiment, the smart irrigation system includes a plurality of drive towers. In another embodiment, the irrigation system includes a plurality of tower control units. In another embodiment, a particular tower control unit is disposed on a particular drive tower of the plurality of drive towers. In another embodiment, the particular drive tower is mechanically coupled to a first pipe span and a second pipe span of the plurality of pipe spans. In another embodiment, the particular tower control unit includes: one or more processors, one or more memory units, and communication circuitry. In another embodiment, the communication circuitry is configured to transceiver one or more signals between the particular tower control unit and one or more additional tower control units.

A tower control unit is disclosed, in accordance with one or more embodiments of the present disclosure. In one embodiment, the tower control unit includes an enclosure. In another embodiment, the enclosure includes one or more sensor units configured to measure one or more signals indicative of one or more operational conditions. In another embodiment, the enclosure includes one or more processors configured to configured to determine one or more operational conditions based on the measured one or more signals. In another embodiment, the enclosure includes communication circuitry configured to transmit at least one of a notification or a control signal based on the one or more operational conditions. In another embodiment, the tower control unit includes a base, wherein the base is configured for being mechanically coupled to a portion of an irrigation system, wherein the base is configured to reversibly coupling the enclosure to the base. In another embodiment, the base or enclose includes one or more indicator lights.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 4A-4B illustrate top-down schematic views of the smart irrigation system, in accordance with one or more embodiments of the present disclosure.

DETAILED DESCRIPTION OF THE INVENTION

Reference will now be made in detail to the subject matter disclosed, which is illustrated in the accompanying drawings. Referring generally to FIGS. 1A through 7, a smart irrigation system is disclosed, in accordance with one or more embodiments of the present disclosure. The embodiments set forth herein are taken to be illustrative rather than limiting. It should be readily apparent to those of ordinary skill in the art that various changes and modifications in form and detail may be made without departing from the spirit and scope of the present disclosure.

Embodiments of the present disclosure are directed to a smart irrigation system equipped with multiple tower control units. The multiple control units are configured for transmitting/receiving information between each other and may include one or more on-on-board sensors. Additional embodiments of the present disclosure utilize the on-board or addition in-field sensors (e.g., contact and/or non-contact sensors) to measure one or more operational conditions of one or more components of the irrigation system or its surroundings. Based on the measured one or more operational conditions, the one or more control units may adjust one or more components of the irrigation system (e.g., drive system of a drive tower) to compensate for a malfunction (or anticipated malfunction), a less-than-optimal configuration of the irrigation system (e.g., misalignment of spans/towers), or an in-field condition (e.g., obstacle). For example, embodiments of the present disclosure may employ lidar, radar, acoustic, inertial and/or other non-contact sensor feedback to control the alignment, component speed, component position, collision avoidance, or other status or fault characteristics of the irrigation system.

Figure 1A:
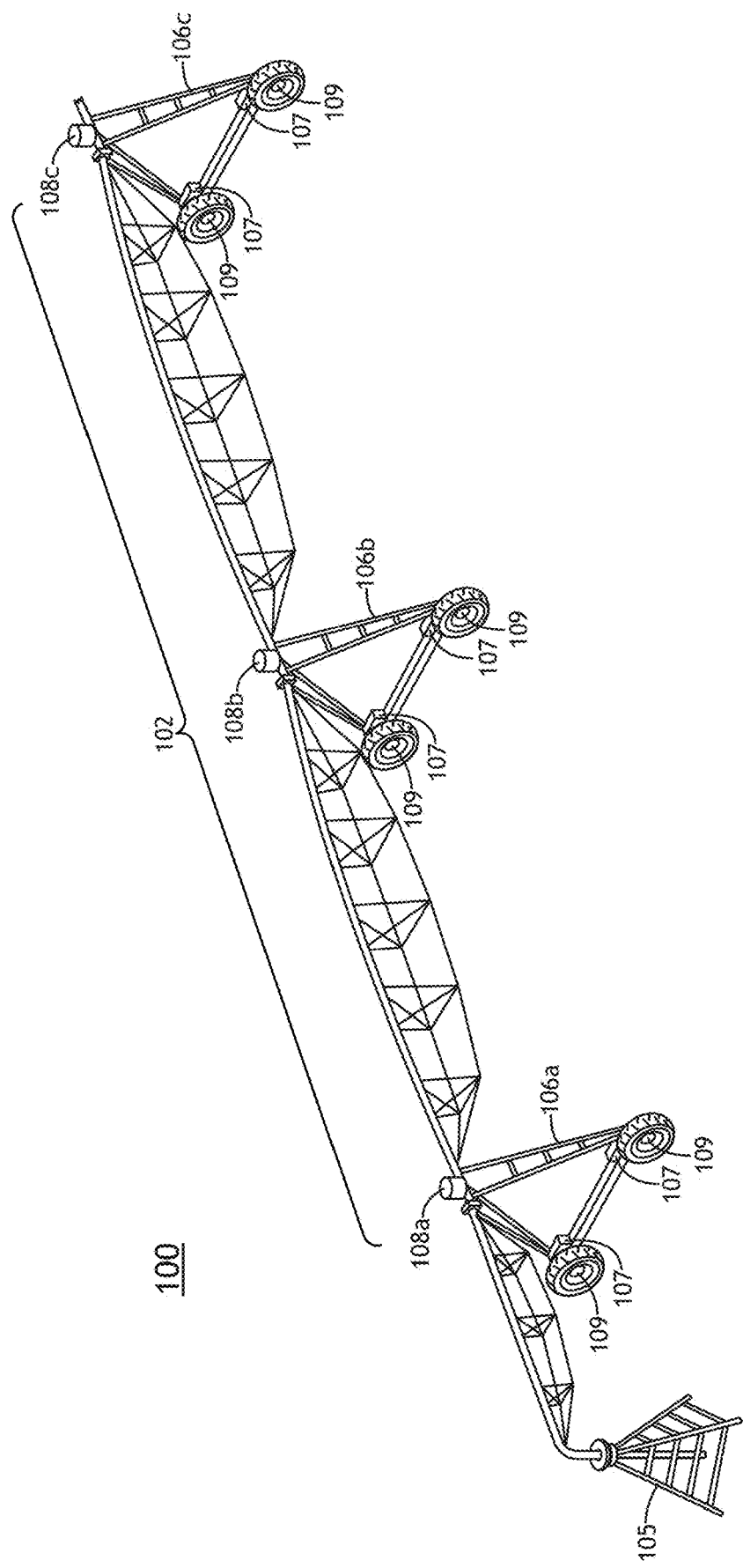
FIG. 1A illustrates a perspective view of a smart irrigation system, in accordance with one or more embodiments of the present disclosure.
Figure 1B:
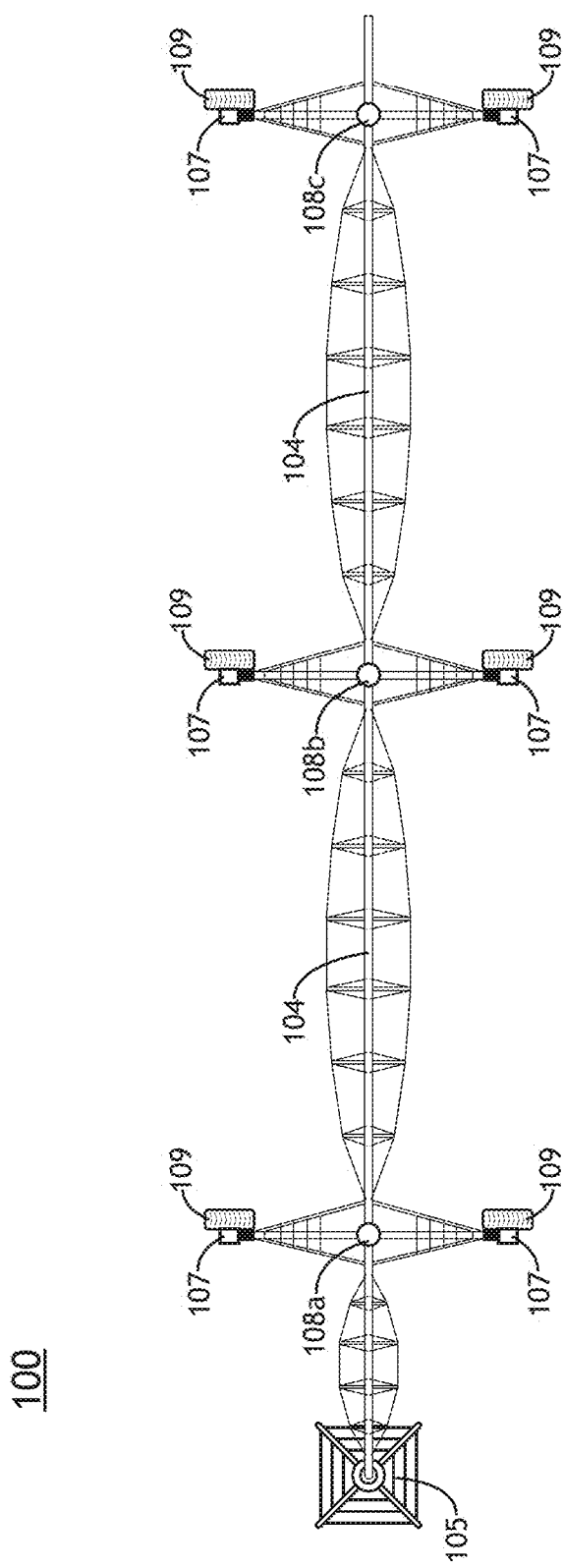
FIG. 1B illustrates a top view of the smart irrigation system, in accordance with one or more embodiments of the present disclosure.

FIG. 1A illustrates a perspective view of an irrigation system 100, in accordance with one or more embodiments of the present disclosure. FIG. 1B illustrates a top view of the smart irrigation system 100. In one embodiment, the irrigation system includes a pipeline 102. The pipeline 102 may include a plurality of pipe spans 104. The pipeline 102 may be configured to carry liquid (e.g., water or a water mixture) along the length of the smart irrigation system 100 from a supply point 105 (e.g., well or tank). The smart irrigation system 100 may include a plurality of drive towers 106 and a plurality of control units 108. For example, a first tower control unit 108a is disposed on a first drive tower 106a, a second tower control unit 108b is disposed on a second drive tower 106b, a third tower control unit is disposed on a third drive tower 106c and so on.

Each drive tower 106 may be coupled to one or more pipe spans 104. For example, a first driver tower 106a may be coupled to a first pipe span 104a and a second pipe span 104b, a second drive tower 106b may be coupled to a third pipe span 104c and a fourth pipe span 104d and so on. The first pipe span 104a may be coupled to the supply point 105. For example, the first pipe span 104a may be in pivotal connection with the supply point 105. In addition, one or more of the drive towers 106 may include a drive system 107 configured to propel the one or more drive towers 106, which allows the one or more drive towers 106 to be maneuvered about an area. For example, the first driver tower 106a may include a first drive system 107a, the second drive tower 106b may include a second drive system 107b, the third drive tower 106c may include a third drive system 107c and so on. The drive systems 107a-107c may include any propulsion means know in the art of irrigation. For example, each of the drive systems 107a-107c may include, but are not limited to, motor-driven wheels 109. By way of another example, although not shown, the drive systems 107a-107c may include a track-based drive system, where each drive tower is propelled via one or more tracks.

While the various of embodiments of the present disclosure have been depicted simplicity in the context of a center-pivot irrigation system, it is noted herein that such a configuration is not a limitation on the scope of the present disclosure. Rather, the smart irrigation system 100 of the present disclosure may include any irrigation system known in the art including, but not limited to, a center-pivot irrigation system, a lateral irrigation system, or a pivoting lateral irrigation system.

Figure 1C:
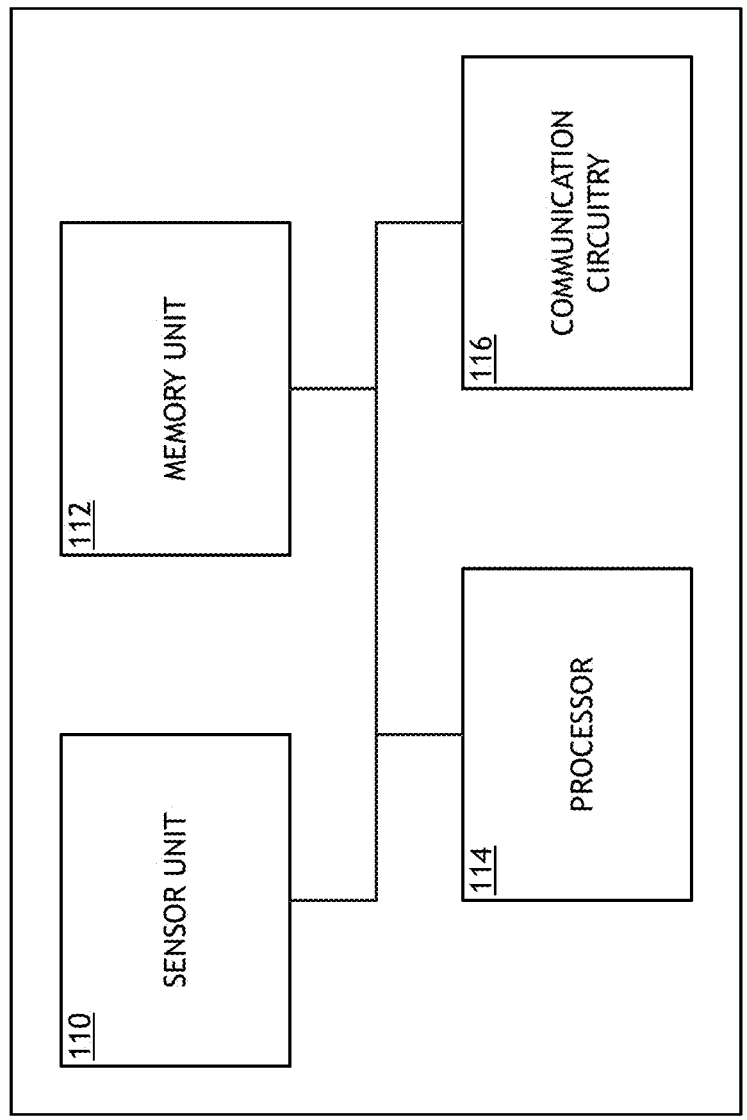
FIG. 1C illustrates a simplified block diagram view of a tower control unit of the smart irrigation system, in accordance with one or more embodiments of the present disclosure.

FIG. 1C illustrates a simplified block diagram view of a tower control unit 108, in accordance with one or more embodiments of the present disclosure. The tower control unit 108 may include a sensor unit 110. The sensor unit 110 may be electrically coupled to a memory unit 112, a processor 114, and a communication circuitry 116, or any combination of the foregoing. The one or more components of the tower control unit 108 may be electronically coupled to the various other components of the tower control unit 108 in any manner known in the art. For example, the sensor unit 110, the memory unit 112, and the processor 114 may be communicatively coupled to each other and other components via a wireline connection (e.g., copper wire, fiber optic cable, soldered connection, and the like) or a wireless connection (e.g., RF coupling, IR coupling, data network communication (e.g., WiFi, WiMAX, Bluetooth, and the like)).

Figure 1D:
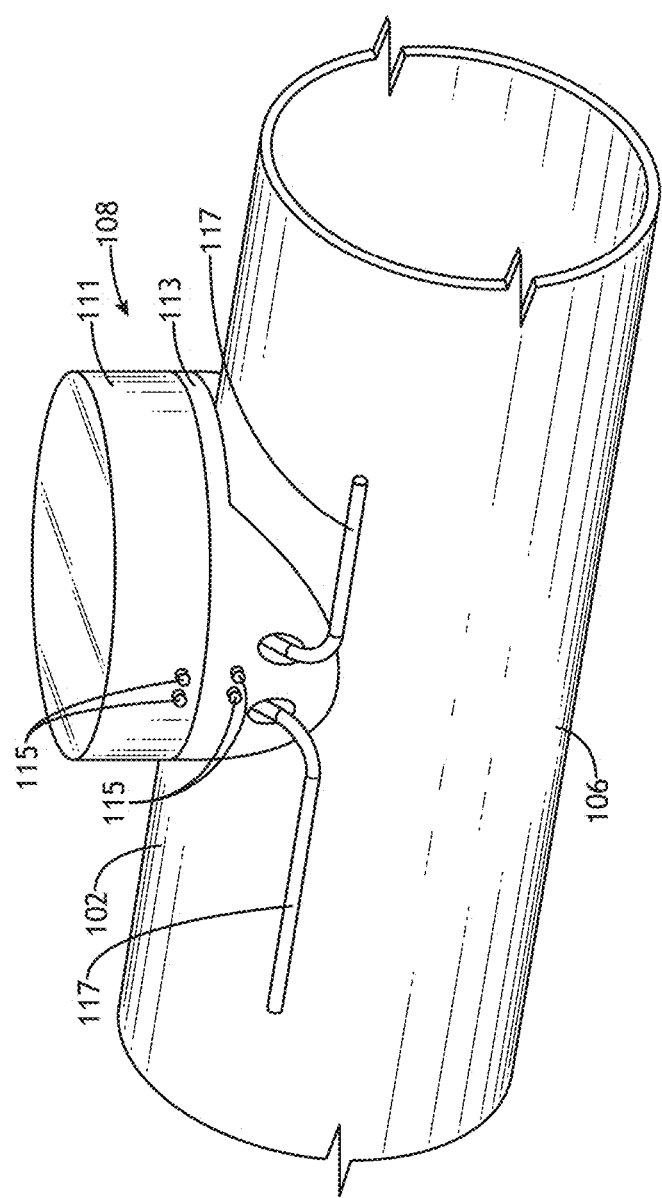
FIG. 1D illustrates an assembled view of the tower control unit, in accordance with one or more embodiments of the present disclosure.
Figure 1E:
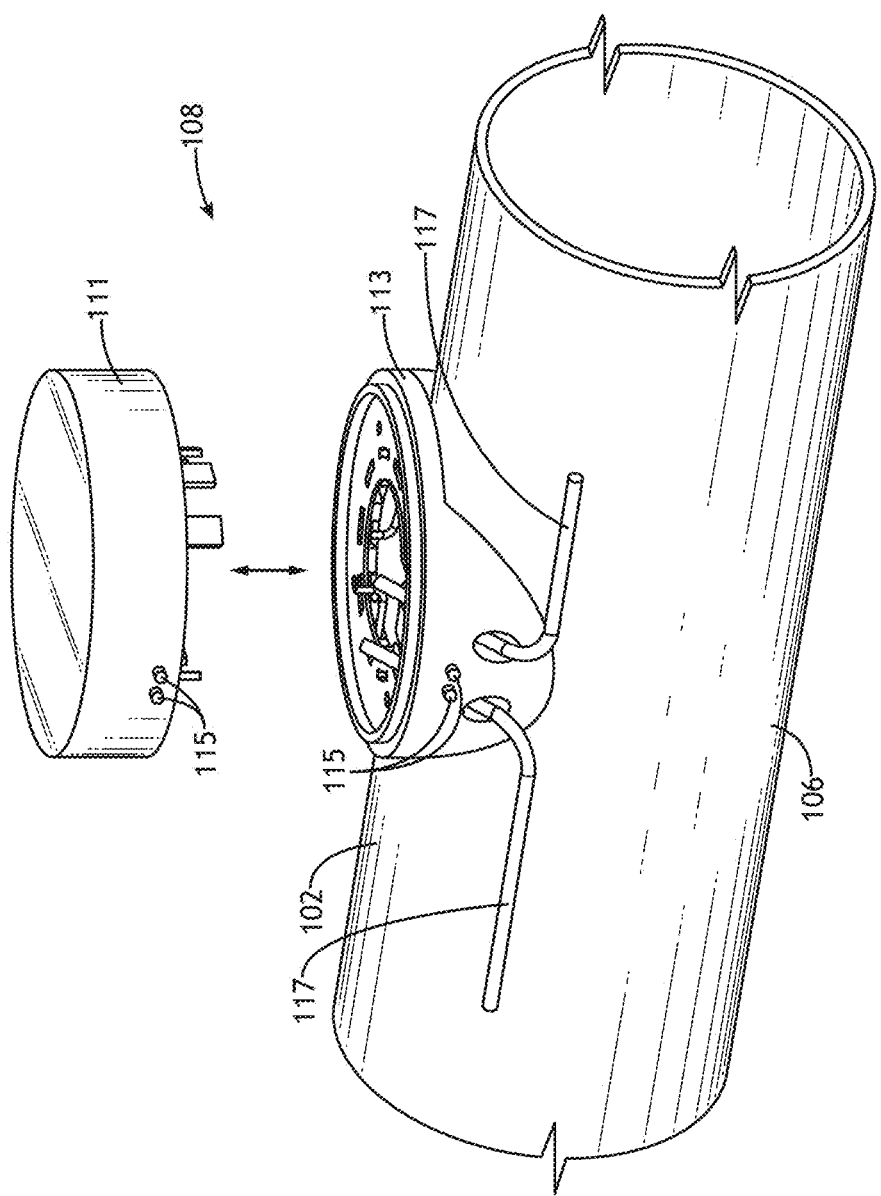
FIG. 1E illustrates an exploded view of the tower control unit, in accordance with one or more embodiments of the present disclosure.

FIG. 1D and 1E illustrate assembled and exploded perspective views of a tower control unit 108, in accordance with one or more embodiments of the present disclosure. In one embodiment, one or more of the components of the tower control unit 108 are housed within an enclosure 111. For example, one or more of the sensor unit 110, the memory unit 112, the processor 114, or the communication circuitry 116 may be housed within the enclosure 111. The enclosure 111 may be formed from a material suitable for protecting the tower control unit 108 from moisture, wind, radiation, or any other condition that may cause damage to the tower control unit 108. In one embodiment, the enclosure 111 may allow for the transmission of signals into and out of the enclosure 111. For example, the enclosure 111 may include a radome. By way of another example, although not shown, the enclosure 111 may include one or more windows, which allow for the transmission of optical signals into and out of the enclosure 111.

In another embodiment, the tower control unit 108 includes a base 113. For example, the base 113 may be coupled to the portion of the drive tower 106 using screws, clips, latches, and the like. The base 113 may be coupled to the portion of the drive tower 106 using a watertight locking electrical plug. The base 113 allows a user to reversibly couple the enclosure 111 to the base 113 and, thus, the drive tower 106).

The base 113 may include one or more openings, busses, outlets, inlets, ports, and the like, so as to permit one or more wireline or wireless connections between the interior of the enclosure 111 and corresponding connection points within the base 113. For example, the enclosure 111 may include one or more male connectors (or female) suitable for coupling with one or more corresponding female connectors (or male) in the base 113 for establishing an electrical and/or communicative connection between the components (e.g., sensor unit 110, memory unit 112, processor 114, communication circuitry 116, and the like) within the enclosure 111 and the components/connections within the base 113. The one or more openings, busses, outlets, inlets, ports, and the like may include one or more watertight locking electrical connectors, wherein the one or more connectors may include one or more caps. The base 113 may house terminals of one or more wires 117 that extend along the pipeline 102.

The enclosure 111 is configured to be reversibly mechanically coupled to the portion of the drive tower 106 via the base 113. For example, the enclosure 111 may be coupled to the base 113 using a twist-lock, screws, clips, latches, and the like, so as to enable a user to replace the enclosure 111 with a new enclosure 111 in an expedient manner. In the foregoing example, the new enclosure 111 may be reversibly mechanically coupled to the existing base 113.

In another embodiment, the tower control unit 108 may include one or more visual indicators. For example, the tower control unit 108 may include, but is not limited to, one or more indicator lights 115 on its external surface configured to indicate to a user information of the operational condition of one or more tower control units 108 or the operational condition of one or more drive towers 106. For example, the one or more indicator lights 115 may include one or more light emitting diodes (LEDs) configured to transmit a colored light signal. In addition, the tower control unit 108 may include multiple color filters (e.g., colored cover) for producing multiple colored light signals. For example, a tower control unit 108 may include a multi-colored light indicator (e.g., LED and color filter) configured for providing different colored light signals for different operational conditions. In one embodiment, the indicator light 115 may transmit a red-colored light to indicate to a user a failure or anticipated failure of some portion of one or more tower control units 108 or drive towers 106. In contrast, the indicator light 115 may transmit a green-colored light to indicate to a user normal operation of the one or more tower control units 108 or drive towers 106. In another embodiment, the indicator light 115 may transmit a red-colored light to indicate to a user a particular alignment condition or collision condition. In contrast, the indicator light 115 may transmit a green-colored light to indicate to a user a particular alignment condition or the absence of a collision condition.

The indicator light 115 may be electrically coupled to one or more portions of the tower control unit 108. In one embodiment, the one or more processors 114 may control the light color and/or the ON/OFF state of the indicator lights 115.

It is noted that the embodiments of the present disclosure are not limited to one or more indicator lights 115. For example, the tower control unit 108 may be configured to provide an indication to a user via any visual indicator.

Referring again to FIG. 1C, in one embodiment, the sensor unit 110 may be configured to measure one or more signals indicative of an operational condition of one or more portions of the irrigation system 100. For example, the sensor unit 110 may be configured to measure one or more signals indicative of an operational condition of one or more of the tower control units 108 or an operational condition of one or more drive towers 106.

In one embodiment, as noted previously herein, the one or more sensors units 110 are disposed within the enclosure 111, whereby the enclosure 111 is attached to a drive tower 106. In another embodiment, one or more sensor units 110 may be disposed at a location different than a drive tower 106. For example, one or more sensor units 110 may be disposed in a field or underground, where the one or more sensor units are communicatively coupled to one or more tower control units 108.

The one or more sensor units 110 may include any sensor type known in the art. In one embodiment, a sensor unit 110 includes a non-contact sensor unit. For example, the sensor unit 110 may include a radar sensor unit, including, without limitation a radar sensor unit configured to transmit electromagnetic waves from a transmitter and to receive electromagnetic waves at a receiver. In another example, the sensor unit 110 may include a lidar sensor unit, including, but not limited to, a lidar sensor unit configured to transmit infrared light from a transmitter and to receive infrared light at a receiver. In a further example, the sensor unit 110 may include an optical sensor unit, including, but not limited to, a photoconductive device, a photovoltaic device, a photodiode, a phototransistor, or an optical switch. In another example, the sensor unit 110 may include an acoustic sensor unit, including, for example, a capacitive microphone. In another embodiment the sensor unit 110 may include an inertial sensor unit, such as a gyroscope or an accelerometer. In a further example, the sensor unit 110 may include, but is not limited to, a hyperspectral sensor unit, including a spatial scanning unit and a thermal emission scanning unit.

In another embodiment, the sensor unit 110 may include a contact sensor unit. For example, the sensor unit 110 may include a temperature sensor unit, such as, but not limited to, a thermocouple or a resistive temperature sensor. In another example, the sensor unit 110 may include a vibration sensor unit, such as, but not limited to, a transducer (e.g., piezoelectric transducer). In a further example, the sensor unit 110 may include a torque sensor unit, such as, but not limited to, a torque transducer. In another example, the sensor unit 110 may include a voltage sensor unit, such as, but not limited to, a voltmeter. In a further example, the sensor unit 110 may include an amperage sensor unit, such as, but not limited to, an ammeter. In another example, the sensor unit 110 may include a soil moisture and nutrient sensor unit, such as, but not limited to, an electrical resistance meter, a water potentiometer, or a tensiometer. In a further example, the sensor unit 110 may include a humidity sensor unit, such as, but not limited to, a hygrometer. In another example, the sensor unit 110 may include an evapotranspiration sensor unit, such as, but not limited to, a lysimeter.

The operational condition measured by the sensor unit 110 may include any operational condition associated with the smart irrigation system 100.

In one embodiment, the sensor unit 110 is configured to measure one or more signals indicative of an alignment condition of the smart irrigation system 100. The alignment condition may include an alignment between two or more pipe spans 104 or two or more drive towers 106.

In another embodiment, the alignment condition includes the angle of alignment between two pipe spans 104. For example, the alignment condition may include the angle of alignment between a first pipe span 104a connected to a drive tower 106a and a second pipe span 104b connected to the same drive tower 106a.

In another embodiment, the alignment condition includes the relative velocity between two or more drive towers 106. For example, the alignment condition may include the velocity difference between a drive tower 106a on which the sensor unit 110 is disposed and an adjacent drive tower 106b.

In another embodiment, the alignment condition includes the geospatial position of two or more drive towers 106. For example, the alignment condition may include the position and orientation of a first drive tower 106a relative to a second drive tower 106b, or some expected position and orientation. Additionally, the alignment condition may include the position and orientation of a drive tower 106 relative to the position and orientation of some other object.

In another embodiment, the sensor unit 110 is configured to measure one or more signals indicative of a collision condition of the smart irrigation system 100.

In one embodiment, the sensor unit 110 is configured to measure one or more signals indicative of a collision condition of the smart irrigation system 100. For example, the collision condition may include the presence of an obstacle (e.g., rocks, debris, vegetation, depressions in the terrain, and the like) in the path of the smart irrigation system 100.

In another embodiment, the sensor unit 110 may be configured to measure the condition or state of the drive tower 106 and the surrounding area. For example, the sensor unit 110 may ascertain field condition, system condition, and crop state, including, but not limited to, soil conditions, weed conditions, pest conditions, wheel track conditions, topographic conditions, drive tower or tower control unit operational condition, drive tower position, drive tower orientation, drive tower speed, water pressure, water flow, crop color, hydration state, maturity state, health state, and crop density state. The sensor unit 110 may determine the tire pressure of a wheel rotationally coupled to the drive tower 106. The sensor unit 110 may identify slippage, or field conditions, system conditions, or crop states that may cause the slippage, of a wheel rotationally coupled to the drive tower 106.

In another embodiment, the sensor unit 110 may be configured to measure one or more signals indicative of a failure or anticipated failure of some portion of one or more tower control units 108. The one or more signals indicative of a failure or anticipated failure may include one or more signals from one or more sensor units 110. For example, the one or more signals indicative of a failure or anticipated failure may include, but are not limited to, one or more signals from a temperature sensor unit and/or one or more signals from a vibration sensor unit. In another embodiment, the failure or anticipated failure may be determined by one or more processors 114 via one or more machine learning processes. For example, the one or more processors 114 may develop a machine learning analyzer using data collected during one or more prior, known failures or anticipated failures. Upon development of a machine learning analyzer, the one or more processors 114 may apply the machine learning analyzer to the one or more signals indicative of one a failure or anticipated failure. It is noted that the embodiments of the present disclosure are not limited to the determination of failures or anticipated failures via machine learning processes. For example, the one or more processors 114 may implement a threshold, wherein the one or more processors 114 may determine that one or more signals indicative of a failure or anticipated failure exceed the threshold, and may execute some pre-determined instruction in response thereto.

In one embodiment, the communication circuitry 116 of a particular tower control unit 108 is configured to transceive (e.g., transmit and/or receive) one or more signals to/from one or more additional tower control units 108. For example, the communication circuitry 116 of a particular tower control unit 108b may transmit and/or receive one or more signals to/from communication circuitry 116 of tower control units 108a, 108b of the adjacent drive towers 106a, 106b. By way of another example, the communication circuitry 116 of a particular tower control unit 108b may transmit/receive one or more signals to/from one or more drive systems 107 of the particular drive tower 106a and/or the adjacent drive towers 106b, 106c. The one or more signals transceived may relate to an operational condition, failure or anticipated failure, or any other condition of the smart irrigation system 100.

FIG. 1E illustrates an example of an adjustment to an alignment condition of the smart irrigation system 100, where the angle of alignment between two pipe spans 104 is θ. The sensor unit 110 may measure one or more signals 124a indicative of the alignment condition of the two pipe spans 104. The one or more signals 124a measured by the sensor unit 110 may include a radio frequency (RF) signal, or any signal produced by a transmitter known in the art to be suitable for the purposes contemplated by the present disclosure. The sensor unit 110 may transmit the one or more signals 124a to the processor 114, which processor 114 may determine alignment condition based on the one or more signals 124a. The processor 114 may determine alignment condition by comparing the one or more signals 124a received by the sensor unit 110 to a standard alignment condition known to the processor 114. The processor 114 may be instructed and/or programmed with a standard alignment condition. In the example illustrated by FIG. 1D, the standard alignment condition known to the processor 114 may include an alignment condition where the angle of alignment between two pipe spans 104 is ϕ. Upon receipt of one or more signals 124a, the processor 114 may determine alignment condition by reference to the standard alignment condition. The processor 114 may then determine one or more alignment adjustments, where the one or more alignment adjustments would cause the alignment condition to be equivalent to the standard alignment condition. The processor 114 may then transmit one or more signals 124b instructive of one or more alignment adjustments to the drive system 107, which drive system 107 may engage the motor-driven wheel 109 to execute the one or more alignment adjustments. The one or more alignment adjustments may include, without limitation, starting or stopping the movement of the drive tower 106, or adjusting the direction of movement of the drive tower 106.

Figure 1F:
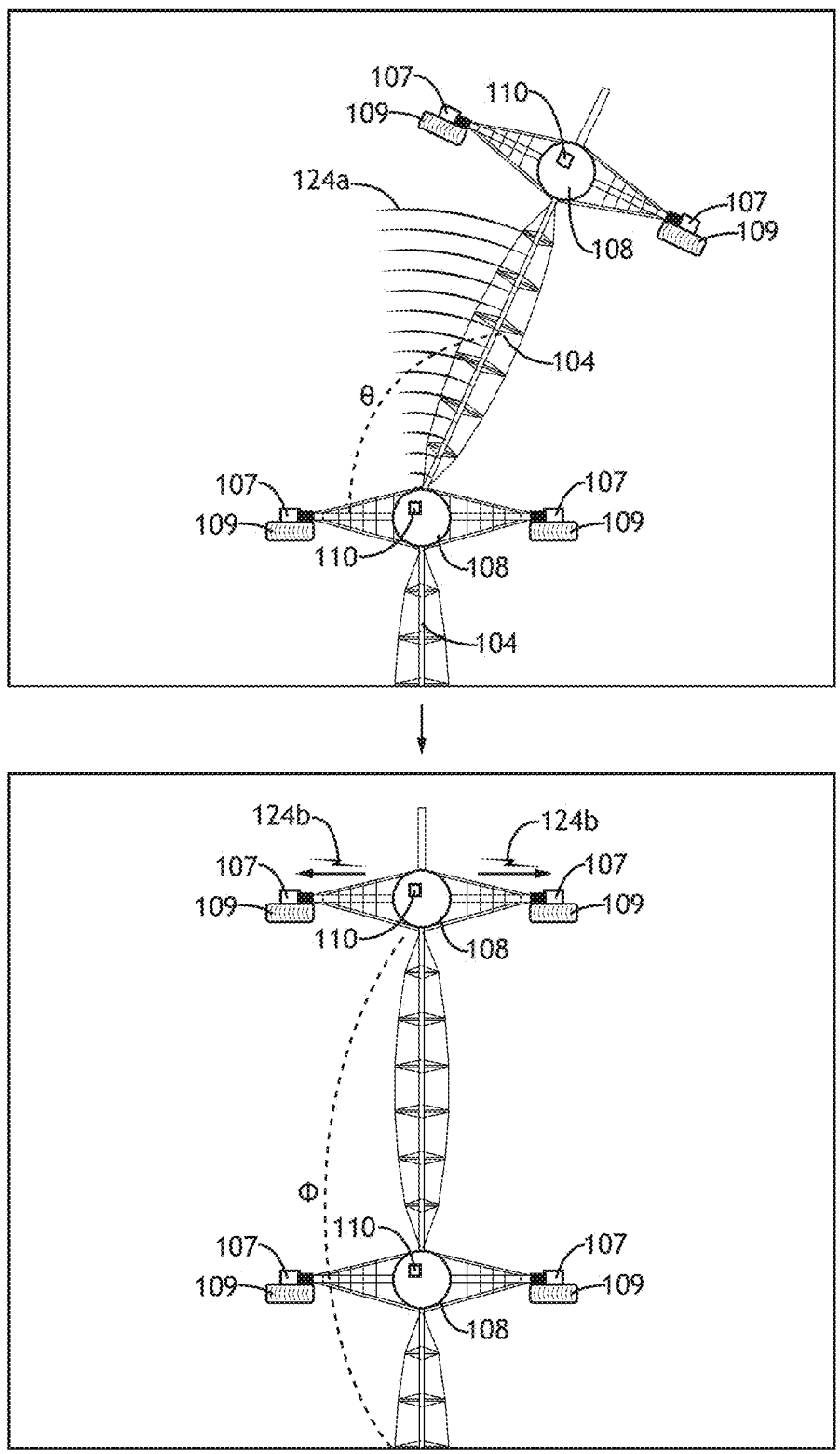
FIG. 1F-1H illustrate sequential views of the smart irrigation system in operation, in accordance with one or more embodiments of the present disclosure.

In another embodiment, as illustrated by FIG. 1F, the sensor unit 110 may measure one or more signals 125a indicative of a collision condition 126. The collision condition 126 may include any condition that would obstruct the movement of an individual drive tower 106 or the movement of the smart irrigation system 100, including, without limitation, rocks, debris, vegetation, depressions in the terrain, and the like. The sensor unit 110 may measure the one or more signals 125a indicative of a collision condition 126 by, as an example, through the use of RF signals, or through the use of a signal produced by a transmitter known in the art to be suitable for the purposes contemplated by the present disclosure. The sensor unit 110 may transmit the one or more signals 125a to the processor 114, which processor 114 may determine alignment condition based on the one or more signals 125a. The processor 114 may then determine one or more collision avoidance adjustments, where the one or more collision avoidance adjustments adjustment would eliminate or mitigate the risk of collision between the collision condition 126 and the smart irrigation system 100. The processor 114 may then transmit one or more signals 125b instructive of one or more collision avoidance adjustments to the drive system 107, which drive system 107 may engage the motor-driven wheel 109 to execute the one or more collision avoidance adjustments. The one or more collision avoidance adjustments may include, without limitation, stopping the movement of the drive tower 106, or adjusting the direction of movement of the drive tower 106.

Figure 1G:
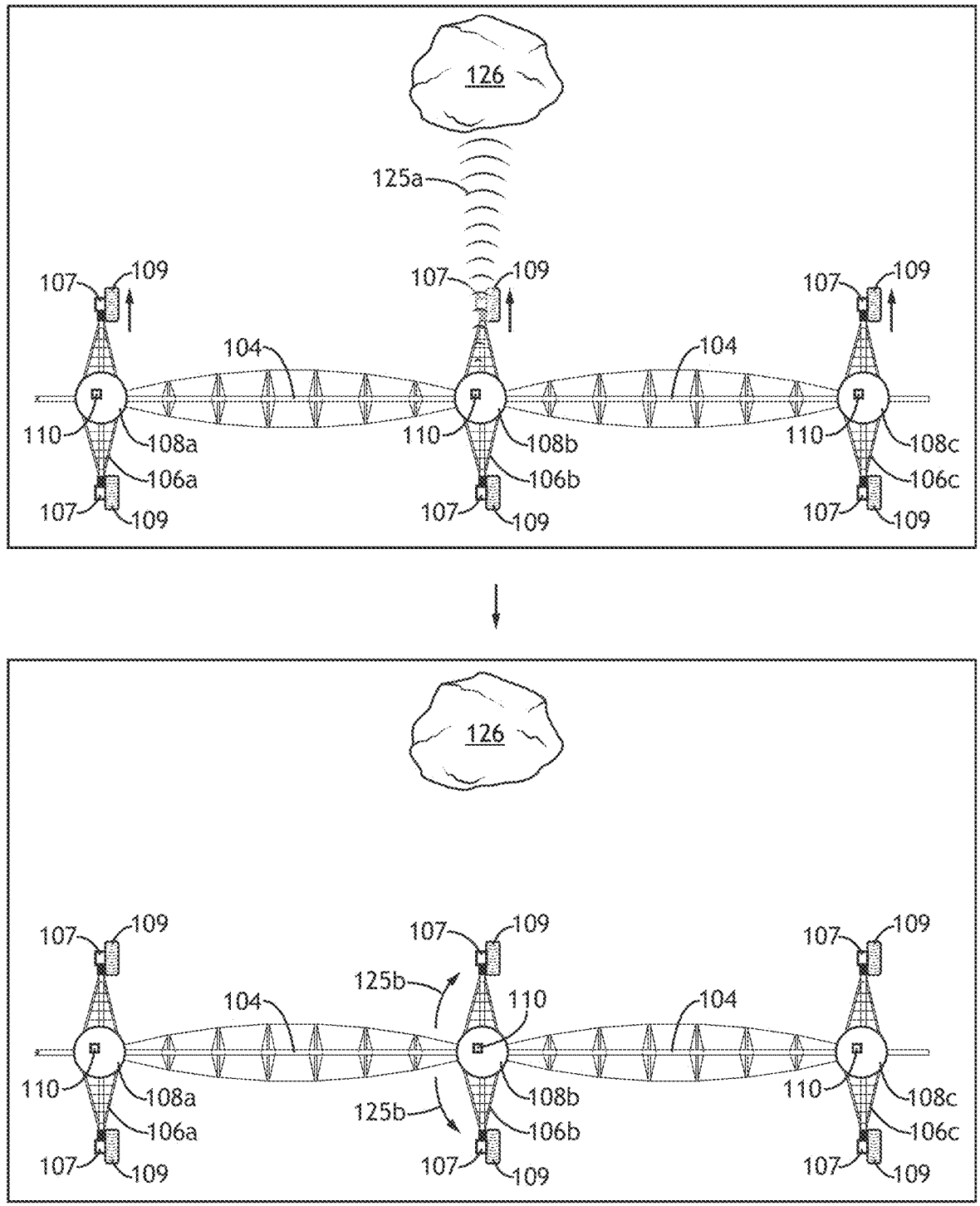
Figure 1H:
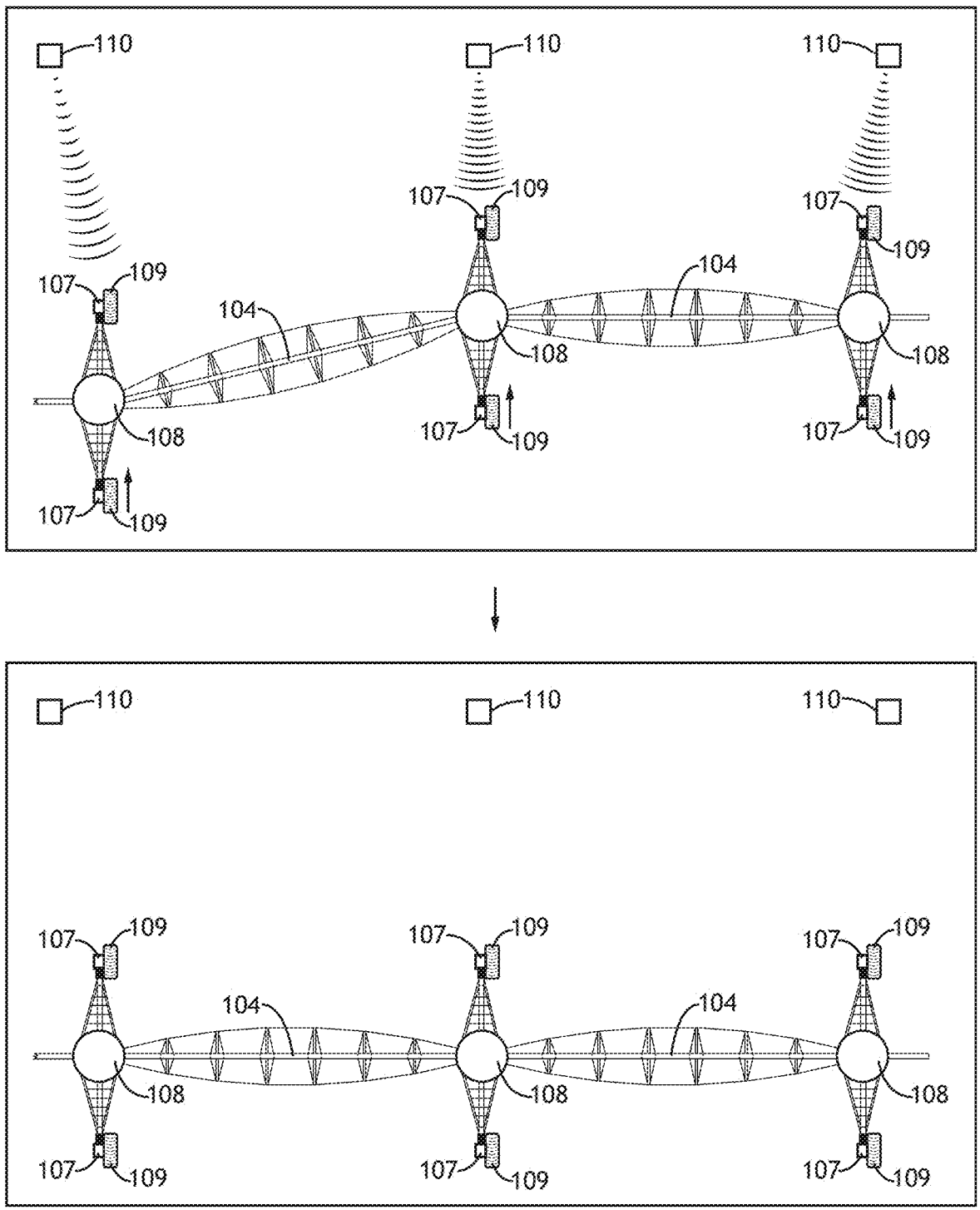

FIG. 1G illustrates an example of an adjustment to the operational condition of one or more drive towers 106. The one or more sensor units 110 may measure one or more signals 125c indicative of one or more velocities of the one or more drive towers 106. In the example illustrated by FIG. 1H, a first drive tower 106a may move at a velocity different from the velocity of either a second drive tower 106b or a third drive tower 106c. The one or more sensor units 110 may measure one or more signals 125c indicative of the one or more velocities of at least one of the first, second, and third drive towers 106a-c. The one or more sensor units 110 may be communicatively coupled to the one or more tower control units 108a-c of the one or more drive towers 106a-c, and may transmit one or more signals indicative of the one or more velocities of at least one of the first, second, and third drive towers 106a-c to the one or more tower control units 108a-c of the one or more drive towers 106a-c. The one or more tower control units 108a-c may, based on the signals indicative of the one or more velocities, determine the one or more velocities and may cause one or more adjustments to the one or more velocities.

Figure 2A:
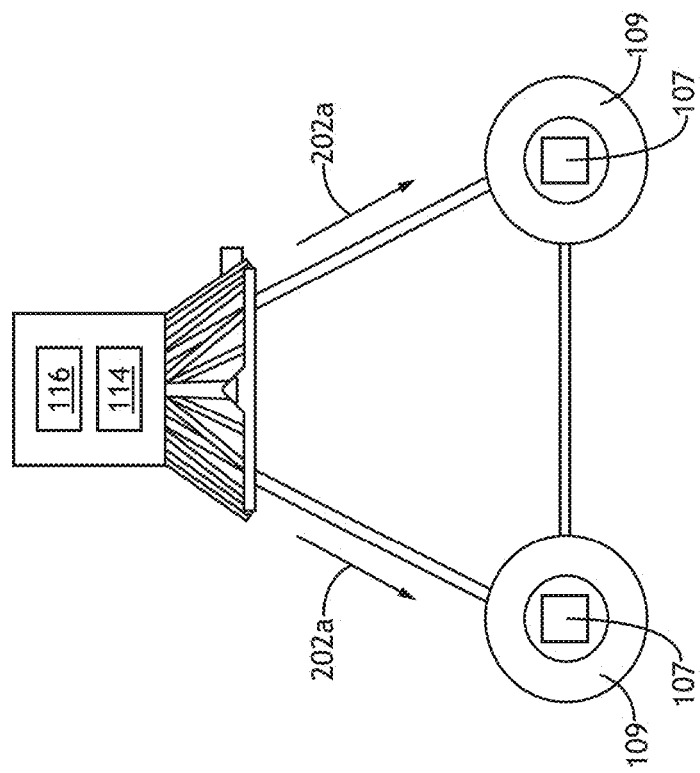
FIG. 2A illustrates a side view of the smart irrigation system, in accordance with one or more embodiments of the present disclosure.

FIG. 2A illustrates a side view of a drive tower 106, in accordance with one or more embodiments of the present disclosure. Upon receipt of a signal from the processor 114, the communication circuitry 116 may transmit a signal 202a to the drive system 107. The signal 202a may, without limitation, instruct the drive system 107 to start or stop movement, adjust the speed of movement, or adjust the direction of movement.

Figure 2B:
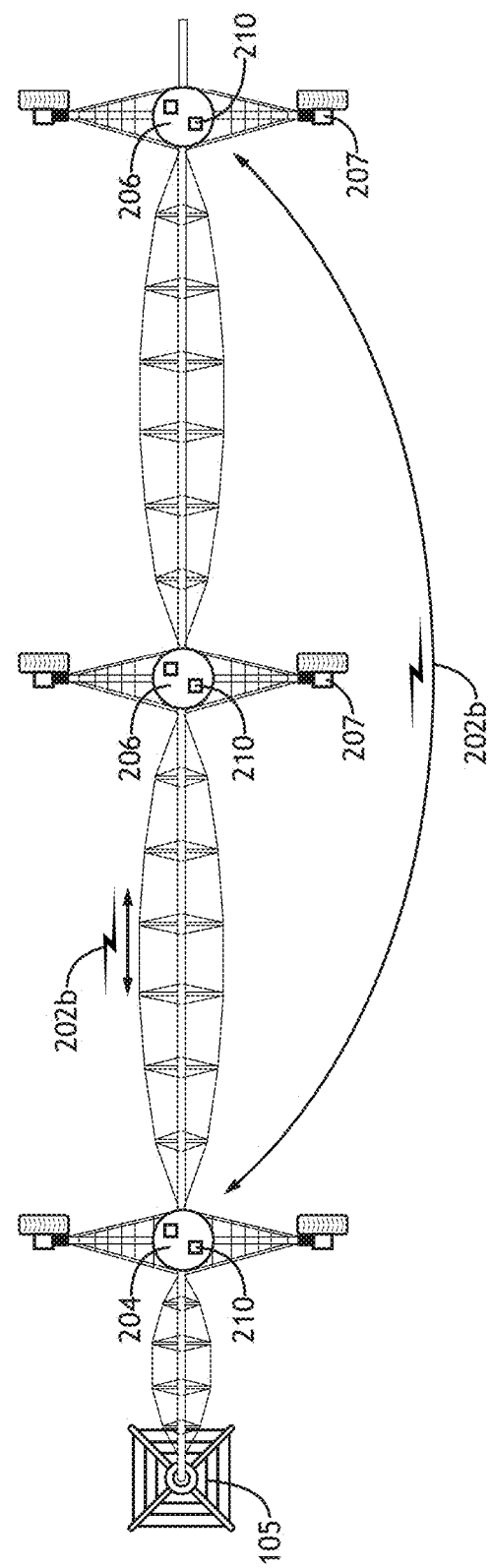
FIG. 2B illustrates a top view of the smart irrigation system, in accordance with one or more embodiments of the present disclosure.

FIG. 2B illustrates a top view of the smart irrigation system 100, in accordance with one or more embodiments of the present disclosure. A parent tower control unit 204 may transmit a signal 202b to a child tower control unit 206. The parent tower control unit 204 may include a tower control unit 108 configured to perform one or more processing functions on behalf of the child tower control unit 206. The child tower control unit 206 may include a tower control unit 108 configured to receive one or more signals 202b from one or more parent tower control units 204. The one or more signals 202b may include a signal indicative of an alignment condition or collision condition of one or more child tower control units 206, or the parent tower control unit 204. The signals 202b may be determined by a parent tower control unit processor 208. Upon receipt of the one or more signals 202b, the one or more child tower control units 206 may transmit the one or more signals 202b to one or more child tower control unit processors 210 for determination of an alignment condition, collision condition, or other condition. In another embodiment, the one or more parent tower control unit processors 208 may determine an alignment condition, collision condition, or other condition of the one or more child tower control units 206, and the one or more parent tower control units 204 may transmit a signal 202b to the one or more child tower control units 206 that directs the one or more child tower control units 206 to execute an instruction based on a determination made by the one or more parent tower control unit processors 208, including by transmitting a signal to a child tower drive system 207.

Figure 3A:
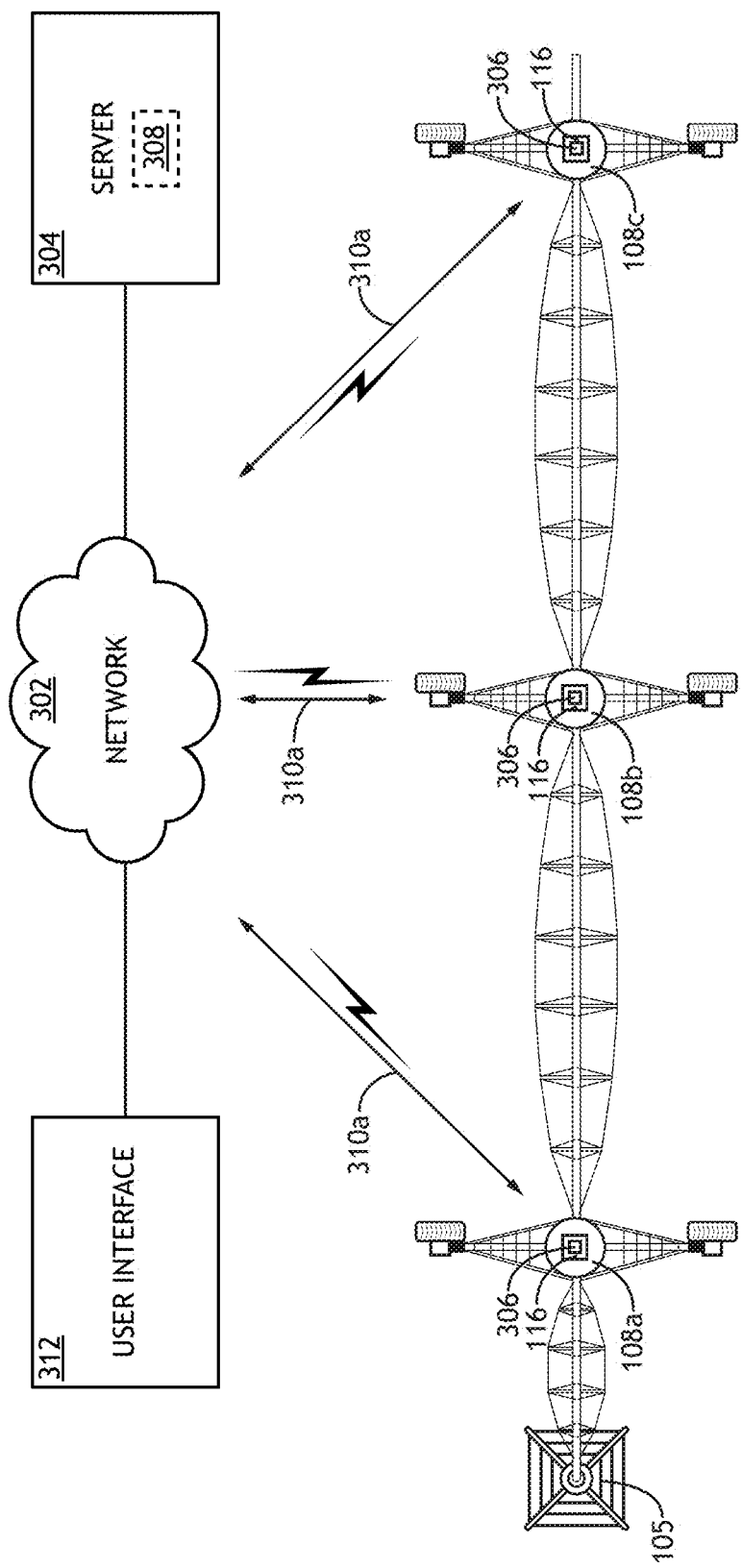
FIGS. 3A-3C illustrate top-down schematic views of the smart irrigation system, in accordance with one or more embodiments of the present disclosure.

FIG. 3A illustrates a top-down simplified schematic view of the smart irrigation system, in accordance with one or more embodiments of the present disclosure. In this embodiment, the one or more tower control units 108a-c are communicatively coupled to directly to a remote server 304 via a network 302. In this regard, the communication circuitry 116 of the one or more tower control units 108a-c may include a network interface device 306 suitable for interacting with the network 302. The remote server 304 may include a network interface device 308 also suitable for interacting with the network 302. The network interface devices 306 and 308, respectively, may include any network interface device known in the art suitable for the purposes contemplated by the present disclosure. For example, the network interface devices 306 and 308, respectively, may include wireline-based interface devices (e.g., DSL-based interconnection, cable-based connection, T9-based interconnection, and the like). In another instance, the network interface devices 306 and 308, respectively, may include a wireless-based interface device employing GSM, GPRS, CDMA, EV-DO, EDGE, WiMAX, 3G, 4G, LTE, 5G, 6G, Wi-Fi protocols, RF, and the like.

In this regard, the one or more tower control units 108 may transmit and receive signals 310a to and from the network 302 that are indicative of an operational condition, alignment condition, collision condition, or other condition of the smart irrigation system 100 and its components. In this sense, the smart irrigation system 100 may act to maintain information on the condition of each of the one or more drive towers 106 in the "cloud" for later retrieval through a user interface 312. The user interface 312 may be communicatively coupled with the network 302, including, without limitation, through one or more integrations with the various systems available on a user's smartphone, computer, and the like. For example, the one or more tower control units 108 may transmit a notification of misalignment, obstacle collision, failure, or anticipated failure to a user device.

In one embodiment, the one or more processors 114 may be arranged in edge computing topology. For example, the one or more processors may be configured to process data locally at the control unit 108 level. In another embodiment, the one or more processors 114 of the one or more tower control units 108 may be configured in a distributed topology. For example, the processors 114 of the irrigation system 100 may process data in conjunction with each other, whereby the processing load of the system is distributed across the multiple processors of the multiple control units 108.

Figure 3B:
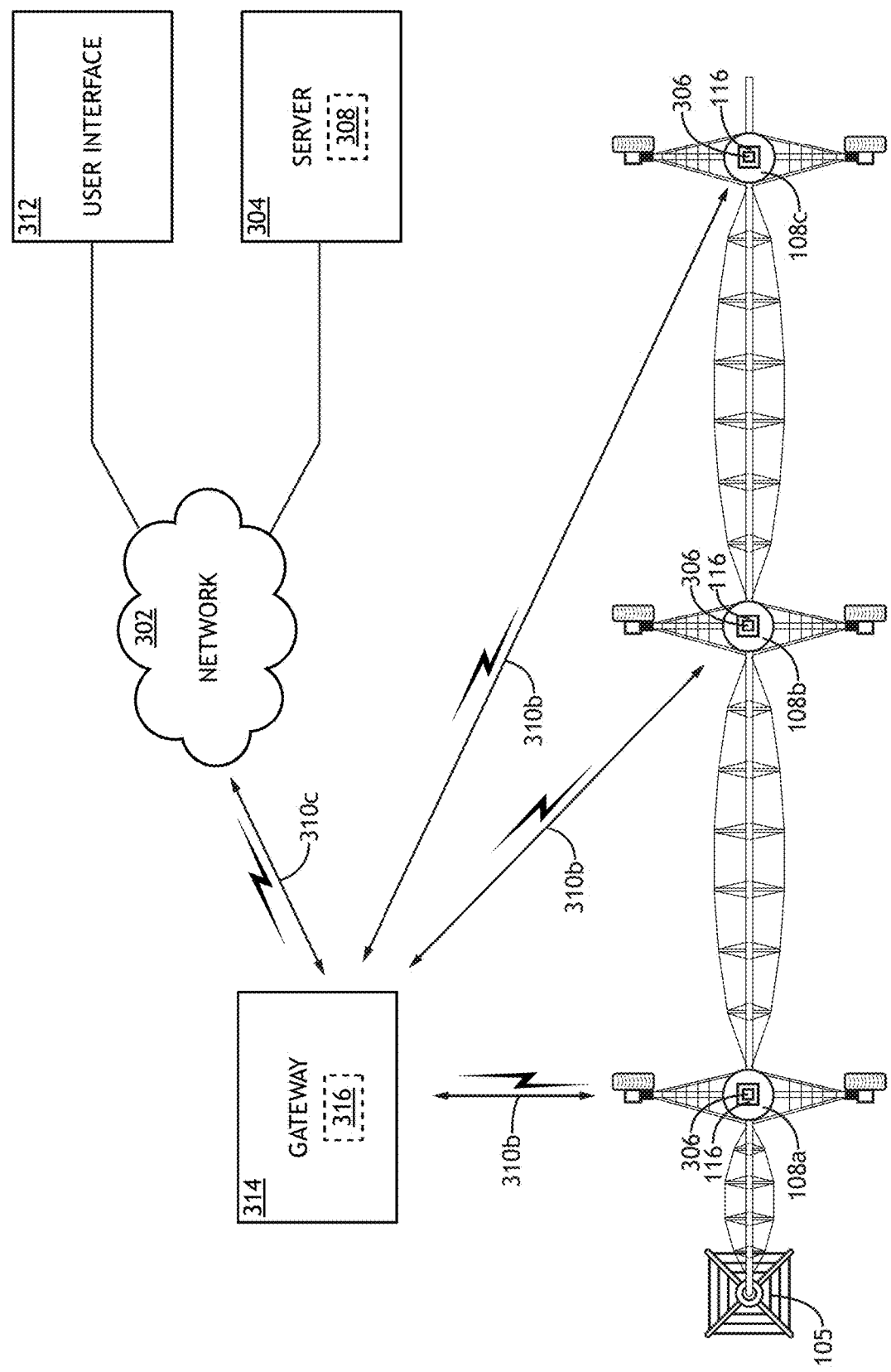

FIG. 3B illustrates a top-down schematic view of the smart irrigation system, in accordance with one or more embodiments of the present disclosure. In this embodiment, the one or more tower control units 108a-c are communicatively coupled to the network 302 via a gateway 314. In this regard, the network interface devices 306 may be configured for interaction with the gateway 314. The one or more tower control units 108 may transmit and receive signals 310b to and from the gateway 314 that are indicative of alignment condition, collision condition, or other condition of the one or more drive towers 106. The gateway 314 may then transmit signals 310c to the network 302. In this regard, the gateway 314 may include a network interface device 316, which may include wireline-based interface devices (e.g., DSL-based interconnection, cable-based connection, T9-based interconnection, and the like). In another instance, the network interface device 316 may include a wireless-based interface device employing GSM, GPRS, CDMA, EV-DO, EDGE, WiMAX, 3G, 4G, LTE, 5G, 6G, Wi-Fi protocols, RF, and the like. The smart irrigation system 100 may employ the gateway 314 to share with the network 302 information on the condition of each of the one or more drive towers 106. In this way, such information may be maintained in the "cloud" for later retrieval through a user interface 312.

Figure 3C:
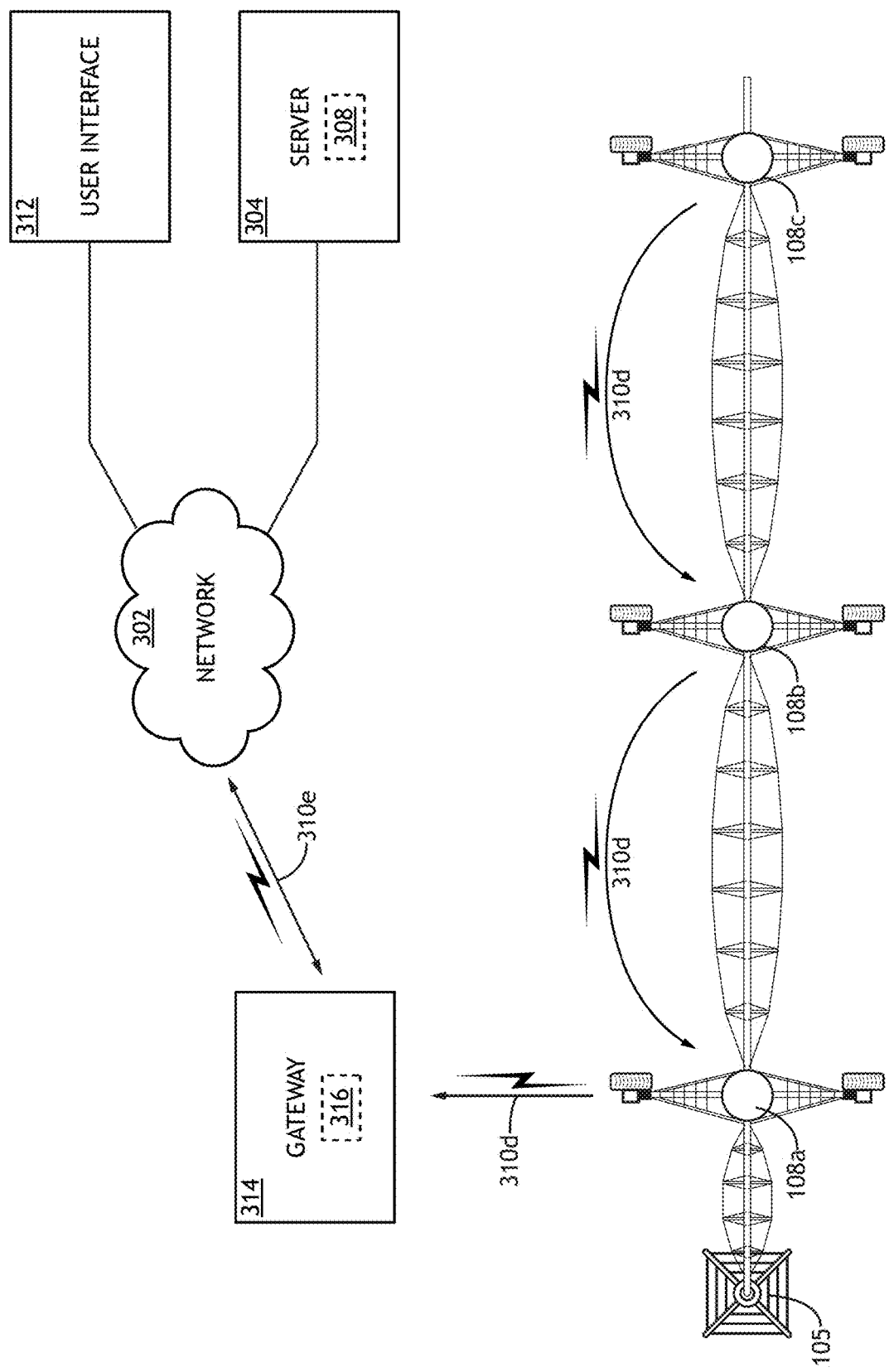

FIG. 3C illustrates a top-down schematic view of an irrigation system, in accordance with one or more embodiments of the present disclosure. The one or more tower control units 108a-c may be configured as "repeaters" and/or "store-and-forward" nodes in that the one or more tower control units 108a-c may be configured to receive data from one or more additional tower control units 108a-c, store the received data, and transmit the stored data to one or more tower control units 108a-c or other portions of the smart irrigation system 100. For example, the one or more tower control units 108a-c configured as illustrated in FIG. 3C may be configured to transmit one or more signals 310d between the one or more tower control units 108a-c until finally transmitting the one or more signals 310d to the gateway 314. In the example illustrated in FIG. 3C, the third tower control unit configured as a repeater 108c may transmit one or more signals 310d to the second tower control unit configured as a repeater 108b, and the second tower control unit configured as a repeater 108b may transmit one or more signals 310d to the first tower control unit configured as a repeater 108a. The first tower control unit configured as a repeater 108a may transmit one or more signals 310e to the gateway 314.

Figure 4A:
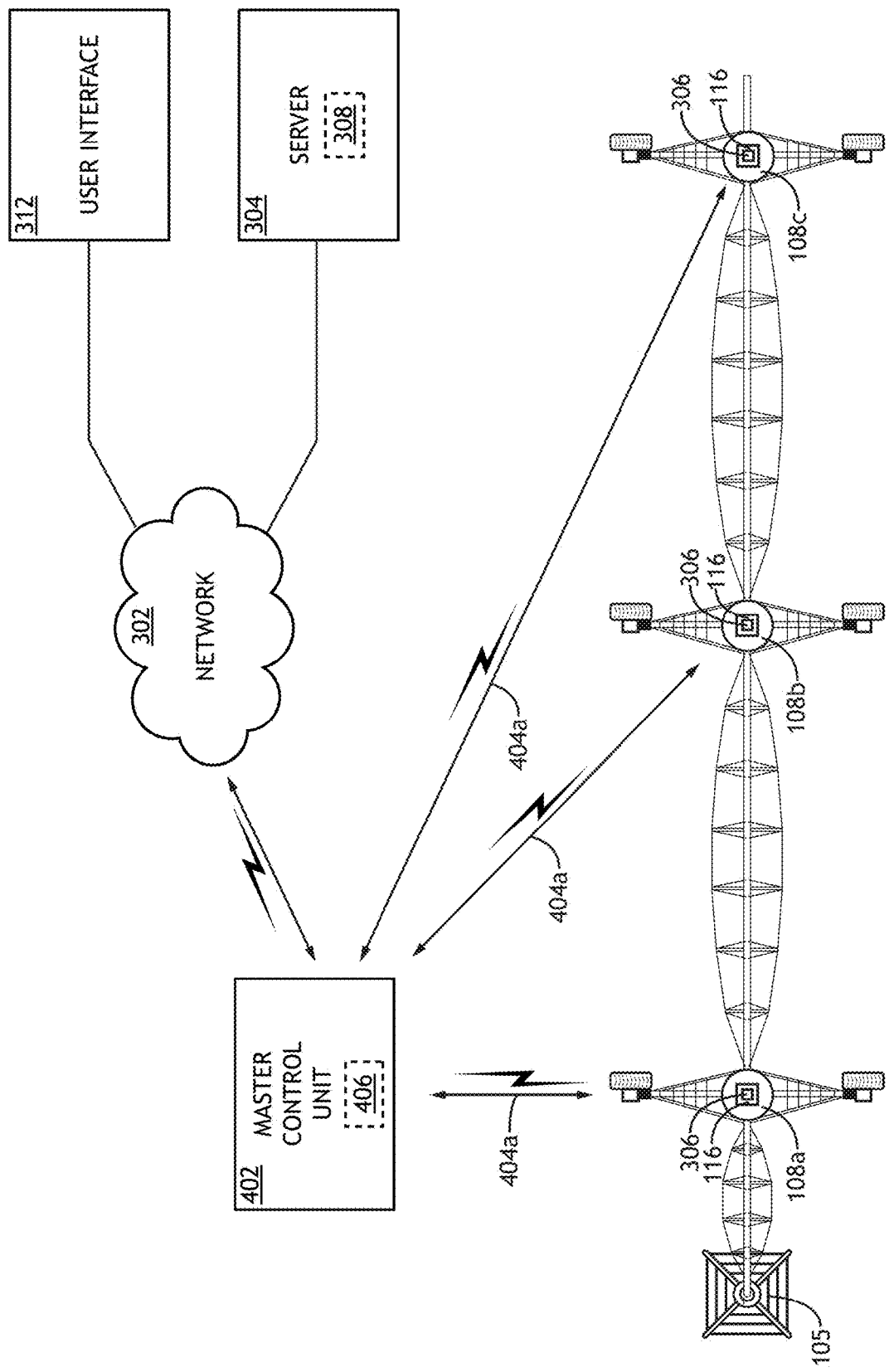

FIG. 4A illustrates a top-down schematic view of an irrigation system, in accordance with one or more embodiments of the present disclosure. The one or more tower control units 108a-c may be communicatively coupled to a master control unit 402. The master control unit 402 may include a tower control unit 108 configured to perform substantially all of the processing functions of the one or more tower control units 108a-c. In this regard, the one or more tower control units 108a-c of the smart irrigation system 100 may perform limited processing functions. The master control unit 402 may be communicatively coupled to the network 302 via a network interface device 406. The network interface device 406 may include wireline-based interface devices (e.g., DSL-based interconnection, cable-based connection, T9-based interconnection, and the like). In another instance, the network interface device 406 may include a wireless-based interface device employing GSM, GPRS, CDMA, EV-DO, EDGE, WiMAX, 3G, 4G, LTE, 5G, 6G, Wi-Fi protocols, RF, and the like.

In this regard, the master control unit 402 is configured to perform substantially all of the processing functions of the smart irrigation system 100, including, without limitation, determining an operational condition, alignment condition, a collision condition, or other condition of the smart irrigation system 100 and its components, based on signals that may be indicative of any of the foregoing conditions received from the communication circuitry 116 of any of the one or more tower control units 108a-c. The master control unit 402 may also determine appropriate adjustments to the operational condition, alignment condition, collision condition, or other condition of the smart irrigation system 100, and may transmit signals 404a to any of the one or more tower control units 108a-c. The signals 404a transmitted by the master control unit 402 to any of the one or more tower control units 108a-c may include, without limitation, instructions to execute an adjustment to a condition of the smart irrigation system 100, including by transmitting a signal to the drive system 107 of one or more drive towers 106.

In this regard, the smart irrigation system 100 may employ the master control unit 402 to share with the network 302 information on the condition of each of the one or more drive towers 106. In this way, such information may be maintained in the "cloud" for later retrieval through a user interface 312.

FIG. 4B illustrates a top-down schematic view of an irrigation system, in accordance with one or more embodiments of the present disclosure, where the master control unit 402 may be disposed on one or more drive towers 106a-c.

The memory unit 112 may include a memory unit or storage medium known in the art to be suitable for storing program instructions executable by the processor 114. For example, the memory unit 112 may include a non-transitory memory medium. For instance, the memory unit 112 may include, but is not limited to, a read-only memory (ROM), a random access memory (RAM), a magnetic or optical memory device, a magnetic tape, a solid state drive, and the like. In another embodiment the memory unit 112 may be configured for storing one or more signals received from the sensor unit 110. It is further noted that the memory unit 112 may be housed in a common housing with the processor 114. In an alternative embodiment, the memory unit 112 maintains program instructions for causing the processor 114 to carry out various steps described in the present disclosure.

The processor 114 of each of the tower control units 108a-108c may include any one or more processing elements known in the art. In general, the term "processor" may be broadly defined to encompass any device having one or more processing elements, which execute program instructions from a non-transitory memory medium (i.e., memory). In one embodiment, the processor 114 may include any microprocessor-type computational device configured to execute software algorithms and/or instructions. In general, the processor may be broadly defined to encompass any device having data processing or logic capabilities. It should be recognized that the steps described throughout the present disclosure may be carried out by a single tower control unit or multiple tower control units.

The communication circuitry 116 may include any communication circuitry known in the art. The communication circuitry 116 may include one or more components that may be configured to transmit data in a manner that combines elements of the foregoing configurations of transmission. For instance, the communication circuitry 116 may include wireline-based communication circuitry (e.g., DSL-based interconnection, cable-based interconnection, T9-based interconnection, fiber-optic lines, and the like). In another instance, the communication circuitry 116 may include wireless-based communication circuitry, such as one or more of GSM, GPRS, CDMA, EV-DO, EDGE, WiMAX, 3G, 4G, LTE, 5G, 6G, Wi-Fi protocols, LoRa, customized RF protocol, and the like.

Figure 5:
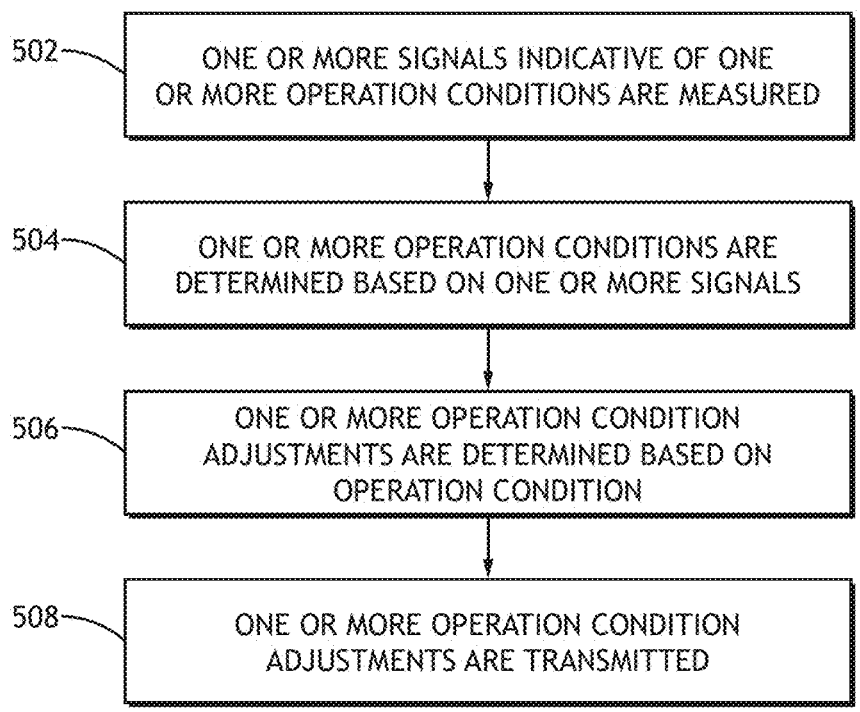
FIG. 5 illustrates a process flow diagram depicting one or more methods for performing an operational condition adjustment, in accordance with one or more embodiments of the present disclosure.

FIG. 5 illustrates a process flow diagram depicting one or more methods 500 for making an adjustment to an operational condition.

In step 502, one or more signals indicative of one or more operational conditions are measured. For example, the one or more sensor units 110 may measure one or more signals 124 indicative of the one or more operational conditions.

In step 504, the one or more operational conditions are determined based on the one or more signals indicative of the one or more operational conditions. For example, the one or more processors 114 may determine the one or more operational conditions based on the one or more signals indicative of the one or more operational conditions.

In step 506, one or more operational condition adjustments are determined. For example, the one or more operational condition adjustments are determined by the one or more processors 114 based on the one or more operational conditions.

In step 508, the one or more operational condition adjustments are transmitted. For example, the one or more operational condition adjustments are transmitted to one or more tower control units 108. The one or more tower control units 108 may include tower control units 108 configured as child tower control units 206, or tower control units 108 communicatively coupled to a master control unit 402. The one or more tower control units 108 may then transmit one or more signals to one or more drive systems 107, which one or more drive systems 107 may engage one or more motor-driven wheels 109 to execute the one or more alignment adjustments.

Figure 6:
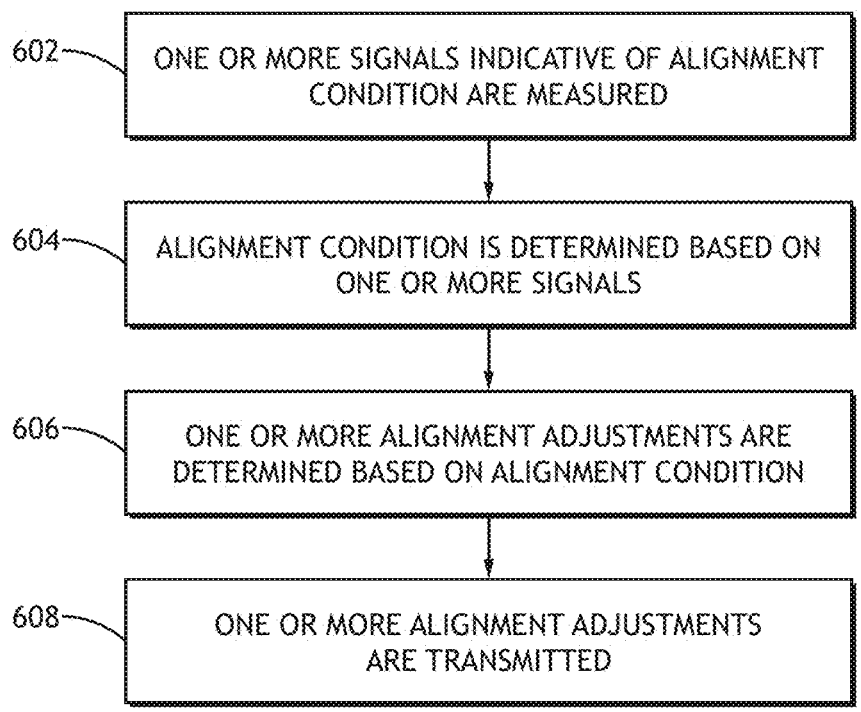
FIG. 6 illustrates a process flow diagram depicting one or more methods for performing an alignment adjustment, in accordance with one or more embodiments of the present disclosure.

FIG. 6 illustrates a process flow diagram depicting one or more methods 600 for making an alignment adjustment.

In step 602, one or more signals 124a indicative of one or more alignment conditions of the smart irrigation system 100 are measured. For example, the one or more sensor units 110 may measure one or more signals 124a indicative of one or more alignment conditions of the smart irrigation system 100. The one or more sensor units 110 may measure signals 124a indicative of one or more alignment conditions with respect to the drive tower 106 on which the tower control unit 108 housing the particular one or more sensor units 110 may be disposed, or, alternatively, the one or more sensor units 110 may measure signals 124a indicative of one or more alignment conditions with respect to an adjacent drive tower 106.

In step 604, one or more alignment conditions are determined based on the one or more signals 124a indicative of the one or more alignment conditions. For example, the one or more alignment conditions are determined by one or more processors 114. The one or more processors 114 may include local processors (e.g., processors 114 included within the communication circuitry 116 of the tower control unit 108 housing the one or more sensor units 110 that measured the one or more signals 124a indicative of the one or more alignment conditions), or, in some instances, may include non-local processors (e.g., parent tower control unit processors 208, or processors 114 included within a master control unit 402).

In step 606, one or more alignment adjustments are determined based on the one or more alignment conditions. The one or more alignment adjustments may include, without limitation, starting or stopping the movement of a drive tower 106, or adjusting the direction of movement of a drive tower 106.

In step 608, one or more alignment adjustments are transmitted. For example, the one or more alignment adjustments are transmitted to one or more tower control units 108. The one or more tower control units 108 may include tower control units 108 configured as child tower control units 206, or tower control units 108 communicatively coupled to a master control unit 402. The one or more tower control units 108 may then transmit one or more signals to one or more drive systems 107, which one or more drive systems 107 may engage one or more motor-driven wheels 109 to execute the one or more alignment adjustments.

Figure 7:
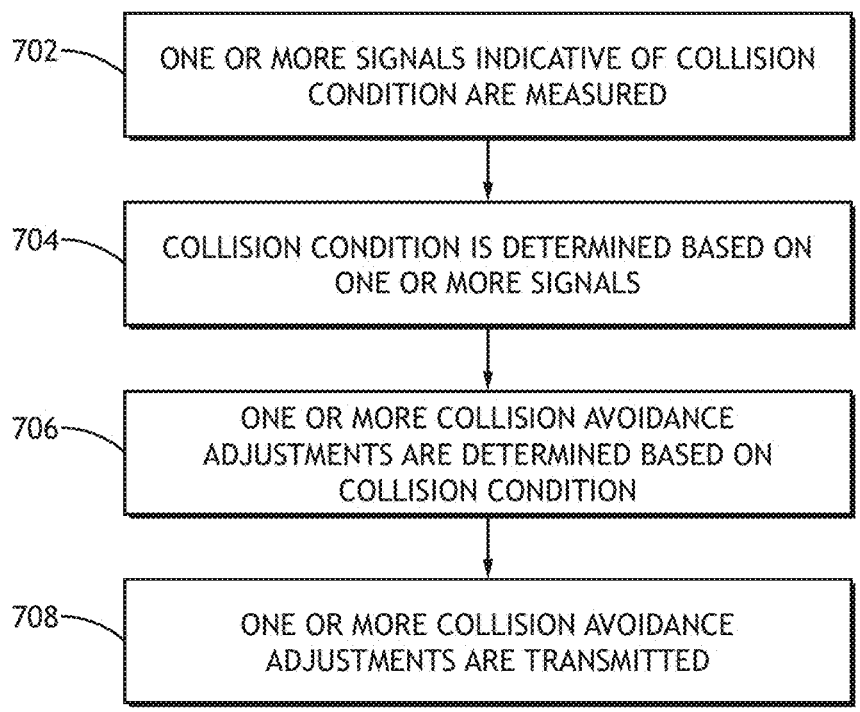
FIG. 7 illustrates a process flow diagram depicting one or more methods for performing a collision avoidance adjustment, in accordance with one or more embodiments of the present disclosure.

FIG. 7 illustrates a process flow diagram depicting a method 700 for making a collision avoidance adjustment.

In step 702, one or more signals 125a indicative of one or more collision conditions 126 are measured. For example, the one or more sensor units 110 may measure signals 125a indicative of one or more collision conditions with respect to the drive tower 106 on which the tower control unit 108 housing the particular one or more sensor units 110 may be disposed, or, alternatively, the one or more sensor units 110 may measure signals 125a indicative of one or more collision conditions with respect to an adjacent drive tower 106. In some embodiments, the one or more sensor units may measure signals 125a with respect to both of the foregoing varieties of drive towers 106.

In step 704, one or more collision conditions based on the one or more signals 125a indicative of one or more collision conditions are determined. The one or more processors may include local processors (e.g., processors 114 included within the communication circuitry 116 of the tower control unit 108 housing the one or more sensor units 110 that measured the one or more signals 125a indicative of a collision condition), or, in some instances, may include non-local processors (e.g., parent tower control unit processors 208, or processors 114 included within a master control unit 402).

In step 706, one or more collision avoidance adjustments are determined based on the one or more collision conditions. The one or more collision avoidance adjustments may include, without limitation, starting or stopping the movement of a drive tower 106, or adjusting the direction of movement of a drive tower 106.

In step 708, the one or more collision avoidance adjustments are transmitted. For example, the one or more collision avoidance adjustments may be transmitted to one or more tower control units 108. The one or more tower control units 108 may include tower control units 108 configured as child tower control units 206, or tower control units 108 communicatively coupled to a master control unit 402. The one or more tower control units 108 may then transmit one or more signals to one or more drive systems 107, which one or more drive systems 107 may engage one or more motor-driven wheels 109 to execute the one or more collision avoidance adjustments.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively, or additionally, in some variants, an implementation may include special-purpose hardware, software, firmware components, and/or general-purpose components executing or otherwise invoking special-purpose components. Specifications or other implementations may be transmitted by one or more instances of tangible transmission.

Alternatively, or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed:

1. An irrigation system comprising:
   a pipeline including a plurality of pipe spans;
   a plurality of drive towers; and
   a plurality of tower control units, wherein a particular tower control unit is disposed on a particular drive tower of the plurality of drive towers, wherein the particular drive tower is mechanically coupled to a first pipe span and a second pipe span of the plurality of pipe spans, wherein the particular tower control unit comprises:
   one or more processors;
   one or more memory units; and
   communication circuitry configured to transceive one or more signals between the particular tower control unit and one or more additional tower control units,
   wherein at least some of the tower control units include one or more sensor units, wherein the one or more sensor units comprise one or more non-contact sensor units wherein the one or more non-contact sensor units comprise at least one of a radar sensor unit, a lidar sensor unit, an acoustic sensor unit, an optical sensor unit, or a hyperspectral sensor unit, wherein the one or more non-contact sensors are configured to measure a location of an object and further configured to determine a collision condition of one or more pipe spans based on the measured location of the object, wherein the one or more non-contact sensors are housed within a removable enclosure, wherein the removable enclosure includes at least one of a radome or an optical window to allow transmission of signals into and out of the enclosure, wherein the removable enclosure is configured to be reversibly coupled to the drive tower to facilitate replacement or maintenance of the sensor unit, wherein the one or more processors are configured to:
   determine one or more operational conditions of at least one of one or more drive towers or one or more pipe spans, wherein the one or more operational conditions comprise a collision condition of one or more pipe spans and wherein the one or more processors are configured to determine a collision condition of the one or more pipe spans based on the measured location of the object;
   determine one or more collision adjustments based on the determined collision condition; and
   transmit the one or more collision adjustments to one or more drive systems to adjust the movement of the drive towers to mitigate the collision condition.

2. The system of claim 1, wherein at least some of the tower control units includes one or more visual indicators located on an external surface of the enclosure and configured to indicate an operational condition of the at least some of the tower control units to a user.

3. The system of claim 1, wherein the communication circuitry is configured to transceive one or more wireline or wireless signals between the particular tower control unit and one or more additional tower control units.

4. The system of claim 1, wherein the one or more sensor units are disposed in a location different than a drive tower.

5. The system of claim 1, wherein the one or more sensor units further comprise one or more contact sensor units.

6. The system of claim 5, wherein the one or more contact sensor units comprise at least one of a temperature sensor unit, a vibration sensor unit, a torque sensor unit, voltage sensor unit, amperage sensor unit, soil moisture sensor unit, soil nutrient sensor unit, humidity sensor unit, and evapotranspiration sensor unit.

7. The system of claim 1, wherein the communication circuitry of the particular drive tower is configured to transmit a control signal to one or more portions of at least one of the particular drive tower or one or more additional drive towers to adjust a state of at least one of the particular drive tower or the one or more additional drive towers based on the one or more operational conditions.

8. The system of claim 1, wherein the communication circuitry of the particular drive tower is configured to transmit a notification to at least one of a gateway, a remote server, or a user device based on the one or more operational conditions.

9. The system of claim 1, wherein the one or more operational conditions further comprise an alignment condition between a first pipe span and a second pipe span.

10. The system of claim 9, wherein the particular tower control unit comprises a sensor unit configured to measure one or more signals indicative of an alignment condition between the first pipe span and the second pipe span.

11. The system of claim 1, wherein the one or more operational conditions further comprises the velocity of one or more drive towers.

12. The system of claim 11, wherein the particular tower control unit comprises a sensor unit configured to measure one or more signals indicative of the velocity of one or more drive towers.

13. The system of claim 1, wherein the one or more operational condition comprises the geospatial position of one or more drive towers.

14. The system of claim 13, wherein the particular tower control unit comprises a sensor unit configured to measure one or more signals indicative of the geospatial position of one or more drive towers.

15. The system of claim 1, wherein the one or more processors are configured to determine a failure or anticipated failure based on the measured one or more signals indicative of the one or more operational conditions.

16. The system of claim 15, wherein the communication circuitry of the particular drive tower is configured to transmit a control signal to one or more portions of at least one of the particular drive tower or one or more additional drive towers to adjust a state of at least one of the particular drive tower or the one or more additional drive towers based on the anticipated failure event.

17. The system of claim 15, wherein the communication circuitry of the particular drive tower is configured to transmit a notification to at least one of a remote server or a user device based on the anticipated failure event.

18. The system of claim 1, wherein the plurality of tower control units are configured for edge computing to determine one or more operational conditions.

19. The system of claim 1, wherein at least one tower control unit of the plurality of tower control units is configured as one or more parent tower control units, and one or more tower control units of the plurality of tower control units are configured as one or more child tower control units, wherein the one or more parent tower control units are configured to perform one or more processing functions for the one or more child tower control units.

20. The system of claim 1, further comprising a master control unit, wherein the master control unit includes at least one of a processor and communication circuitry, wherein the processor is configured to:
receive, from the one or more sensor units, one or more measured signals indicative of one or more operational conditions of at least one of one or more drive towers or one or more pipe spans;
determine the one or more operational conditions based on the one or more measured signals indicative of one or more operational conditions; and
transmit an instruction to one or more portions of at least one of the particular drive tower or one or more additional drive towers to adjust a state of at least one of the particular drive tower or one or more additional drive towers.

21. The system of claim 1, wherein the irrigation system comprises at least one of a center-pivot irrigation system, a lateral irrigation system, or a pivoting lateral irrigation system.

22. A tower control unit for an irrigation system comprising:
an enclosure, wherein the enclosure comprises:
one or more sensor units configured to measure one or more signals indicative of one or more operational conditions, wherein the one or more sensor units comprise one or more non-contact sensor units, wherein the one or more non-contact sensor units comprise at least one of a radar sensor unit, a lidar sensor unit, an acoustic sensor unit, an optical sensor unit, or a hyperspectral sensor unit, wherein the one or more non-contact sensors are configured to measure a location of an object to determine a collision condition of one or more pipe spans with the object, wherein the one or more non-contact sensors are housed within a removable enclosure, wherein the removable enclosure includes at least one of a radome or an optical window to allow transmission of signals into and out of the enclosure, wherein the removable enclosure is configured to be reversibly coupled to the drive tower to facilitate replacement or maintenance of the sensor unit;
one or more processors configured to:
determine one or more operational conditions of at least one of one or more drive towers or one or more pipe spans, wherein the one or more operational conditions comprise a collision condition of one or more pipe spans and wherein the one or more processors are configured to determine a collision condition of the one or more pipe spans based on the measured location of the object;
determine one or more collision adjustments based on the determined collision condition; and
transmit the one or more collision adjustments to one or more drive systems to adjust the movement of the drive towers to mitigate the collision condition;
communication circuitry configured to transmit at least one of a notification or a control signal based on the one or more operational conditions; and
a base, wherein the base is configured for being mechanically coupled to a portion of an irrigation system, wherein the base is configured to reversibly coupling the enclosure to the base.

23. A tower control unit for an irrigation system comprising:
an enclosure, wherein the enclosure comprises:
one or more sensor units configured to measure one or more signals indicative of one or more operational conditions, wherein the one or more sensor units comprise one or more non-contact sensor units, wherein the one or more non-contact sensor units comprise at least one of a radar sensor unit, a lidar sensor unit, an acoustic sensor unit, an optical sensor unit, or a hyperspectral sensor unit, wherein the one or more non-contact sensors are configured to measure a location of an object to determine a collision condition of one or more pipe spans with the object, wherein the one or more non-contact sensors are housed within a removable enclosure, wherein the removable enclosure includes at least one of a radome or an optical window to allow transmission of signals into and out of the enclosure, wherein the removable enclosure is configured to be reversibly coupled to the drive tower to facilitate replacement or maintenance of the sensor unit;
one or more processors configured to:
determine one or more operational conditions of at least one of one or more drive towers or one or more pipe spans, wherein the one or more operational conditions comprise a collision condition of one or more pipe spans and wherein the one or more processors are configured to determine a collision condition of the one or more pipe spans based on the measured location of the object;
determine one or more collision adjustments based on the determined collision condition; and
transmit the one or more collision adjustments to one or more drive systems to adjust the movement of the drive towers to mitigate the collision condition;

communication circuitry configured to transmit at least one of a notification or a control signal based on the one or more operational conditions; and base, wherein the base is configured for being mechanically coupled to a portion of an irrigation system, wherein the base is configured to reversibly coupling the enclosure to the base, wherein at least one of the enclosure or base include one or more indicator lights.

* * * * *